US011057734B2

(12) United States Patent
Iannotti et al.

(10) Patent No.: US 11,057,734 B2
(45) Date of Patent: Jul. 6, 2021

(54) GEOSPECIFIC INFORMATION SYSTEM AND METHOD

(71) Applicant: CERENCE OPERATING COMPANY, Burlington, MA (US)

(72) Inventors: Vincenzo A. Iannotti, Montreal (CA); Lior Ben-Gigi, Hampstead (CA); Slawek Jarosz, Senneville (CA); David Ardman, Cote Saint Luc (CA)

(73) Assignee: Cerence Operating Company, Burlington, MA (US)

( * ) Notice: Subject to any disclaimer, the term of this patent is extended or adjusted under 35 U.S.C. 154(b) by 0 days.

(21) Appl. No.: 16/681,228

(22) Filed: Nov. 12, 2019

(65) Prior Publication Data

US 2020/0154233 A1    May 14, 2020

Related U.S. Application Data

(63) Continuation of application No. 15/863,528, filed on Jan. 5, 2018, now abandoned.

(51) Int. Cl.

| *H04W 4/021* | (2018.01) |
|---|---|
| *H04W 4/48* | (2018.01) |
| *G06F 16/29* | (2019.01) |
| *H04W 4/02* | (2018.01) |
| *H04W 4/40* | (2018.01) |
| *H04W 4/44* | (2018.01) |

(52) U.S. Cl.
CPC ............ *H04W 4/021* (2013.01); *G06F 16/29* (2019.01); *H04W 4/02* (2013.01); *H04W 4/40* (2018.02); *H04W 4/44* (2018.02); *H04W 4/48* (2018.02)

(58) Field of Classification Search
CPC ......... H04W 4/48; H04W 4/021; H04W 4/44; H04W 4/40; H04W 4/02; G06F 16/29
USPC ...................................................... 455/456.3
See application file for complete search history.

(56) References Cited

U.S. PATENT DOCUMENTS

| 6,199,014 | B1* | 3/2001 | Walker | G01C 21/3647 |
| | | | | 340/995.2 |
| 6,321,158 | B1* | 11/2001 | DeLorme | G01C 21/26 |
| | | | | 340/995.16 |
| 6,795,768 | B2* | 9/2004 | Bragansa | G06F 16/9537 |
| | | | | 701/516 |
| 7,742,623 | B1* | 6/2010 | Moon | G06K 9/00228 |
| | | | | 382/103 |
| 7,834,912 | B2* | 11/2010 | Yoshinaga | G06K 9/0061 |
| | | | | 348/222.1 |
| 9,147,297 | B2* | 9/2015 | Ricci | G08G 1/207 |
| 9,582,937 | B2* | 2/2017 | Anttila | G06T 19/006 |
| 10,170,111 | B2* | 1/2019 | Puranik | G10L 15/24 |
| 2006/0004512 | A1* | 1/2006 | Herbst | G01C 21/206 |
| | | | | 701/431 |
| 2009/0319177 | A1* | 12/2009 | Khosravy | H04W 4/026 |
| | | | | 701/408 |
| 2010/0226535 | A1* | 9/2010 | Kimchi | G06F 3/013 |
| | | | | 382/103 |
| 2012/0109753 | A1 | 5/2012 | Kennewick et al. |  |

(Continued)

*Primary Examiner* — William Nealon
(74) *Attorney, Agent, or Firm* — Occhiuti & Rohlicek LLP

(57) ABSTRACT

A method, computer program product, and computing system for receiving a request for information, concerning a geographically-proximate entity, on a consumer electronic device included within a vehicle. A location of the vehicle is determined; and the geographically-proximate entity is identified based, at least in part, upon the location of the vehicle.

20 Claims, 4 Drawing Sheets

(56) References Cited

U.S. PATENT DOCUMENTS

| | | | |
|---|---|---|---|
| 2013/0091452 A1* | 4/2013 | Sorden | G06N 5/04 |
| | | | 715/771 |
| 2013/0137463 A1 | 5/2013 | Busch | |
| 2014/0195300 A1* | 7/2014 | Chiba | G01C 21/3682 |
| | | | 705/7.29 |
| 2014/0307040 A1* | 10/2014 | Choi | H04W 4/48 |
| | | | 348/14.01 |

* cited by examiner

GEOSPECIFIC INFORMATION SYSTEM AND METHOD

CROSS REFERENCE TO RELATED APPLICATION

This application is a continuation of U.S. patent application Ser. No. 15/863,528, filed on Jan. 5, 2018, the entire contents of all of which are incorporated by reference herein.

TECHNICAL FIELD

This disclosure relates to information systems and, more particularly, to geospecific information systems for use with consumer electronic devices.

BACKGROUND

Today's consumer electronic devices are often controllable via voice commands. For example, these devices may include voice-to-text technology that may convert the user's voice commands into text-based commands. Accordingly, the user may issue a voice command that may be processed by the consumer electronics device to generate a text-based command that may be mapped onto the available functionality of the consumer electronic device.

Unfortunately, the voice interfaces in these consumer electronic devices are often underwhelming. For example, in the event that the user of the consumer electronic device would like information on an entity (e.g., a building, a business, or an object) that they are passing by in their vehicle, the device might not be able to provide the requested information unless the user specifies the exact name or the exact address of the entity (which is often unknown to the user in that situation).

SUMMARY OF DISCLOSURE

In one implementation, a computer-implemented method is executed on a computing device and includes receiving a request for information, concerning a geographically-proximate entity, on a consumer electronic device included within a vehicle. A location of the vehicle is determined; and the geographically-proximate entity is identified based, at least in part, upon the location of the vehicle.

One or more of the following features may be included. A direction of interest of an occupant of the vehicle concerning the geographically-proximate entity is determined. Identifying the geographically-proximate entity based, at least in part, upon the location of the vehicle may include identifying the geographically-proximate entity based, at least in part, upon the location of the vehicle and the direction of interest. Imagery concerning the geographically-proximate entity may be obtained. Identifying the geographically-proximate entity based, at least in part, upon the location of the vehicle may include identifying the geographically-proximate entity based, at least in part, upon the location of the vehicle and the imagery concerning the geographically-proximate entity. Identifying the geographically-proximate entity based, at least in part, upon the location of the vehicle may include requesting additional information concerning the geographically-proximate entity from an occupant of the vehicle. Identifying the geographically-proximate entity based, at least in part, upon the location of the vehicle may include obtaining information concerning the geographically-proximate entity from a datasource.

In another implementation, a computer program product resides on a computer readable medium and has a plurality of instructions stored on it. When executed by a processor, the instructions cause the processor to perform operations including receiving a request for information, concerning a geographically-proximate entity, on a consumer electronic device included within a vehicle. A location of the vehicle is determined; and the geographically-proximate entity is identified based, at least in part, upon the location of the vehicle.

One or more of the following features may be included. A direction of interest of an occupant of the vehicle concerning the geographically-proximate entity is determined. Identifying the geographically-proximate entity based, at least in part, upon the location of the vehicle may include identifying the geographically-proximate entity based, at least in part, upon the location of the vehicle and the direction of interest. Imagery concerning the geographically-proximate entity may be obtained. Identifying the geographically-proximate entity based, at least in part, upon the location of the vehicle may include identifying the geographically-proximate entity based, at least in part, upon the location of the vehicle and the imagery proximate the geographically-proximate entity. Identifying the geographically-proximate entity based, at least in part, upon the location of the vehicle may include requesting additional information concerning the geographically-proximate entity from an occupant of the vehicle. Identifying the geographically-proximate entity based, at least in part, upon the location of the vehicle may include obtaining information concerning the geographically-proximate entity from a datasource.

In another implementation, a computing system includes a processor and memory is configured to perform operations including receiving a request for information, concerning a geographically-proximate entity, on a consumer electronic device included within a vehicle. A location of the vehicle is determined; and the geographically-proximate entity is identified based, at least in part, upon the location of the vehicle.

One or more of the following features may be included. A direction of interest of an occupant of the vehicle concerning the geographically-proximate entity is determined. Identifying the geographically-proximate entity based, at least in part, upon the location of the vehicle may include identifying the geographically-proximate entity based, at least in part, upon the location of the vehicle and the direction of interest. Imagery concerning the geographically-proximate entity may be obtained. Identifying the geographically-proximate entity based, at least in part, upon the location of the vehicle may include identifying the geographically-proximate entity based, at least in part, upon the location of the vehicle and the imagery proximate the geographically-proximate entity. Identifying the geographically-proximate entity based, at least in part, upon the location of the vehicle may include requesting additional information concerning the geographically-proximate entity from an occupant of the vehicle. Identifying the geographically-proximate entity based, at least in part, upon the location of the vehicle may include obtaining information concerning the geographically-proximate entity from a datasource.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
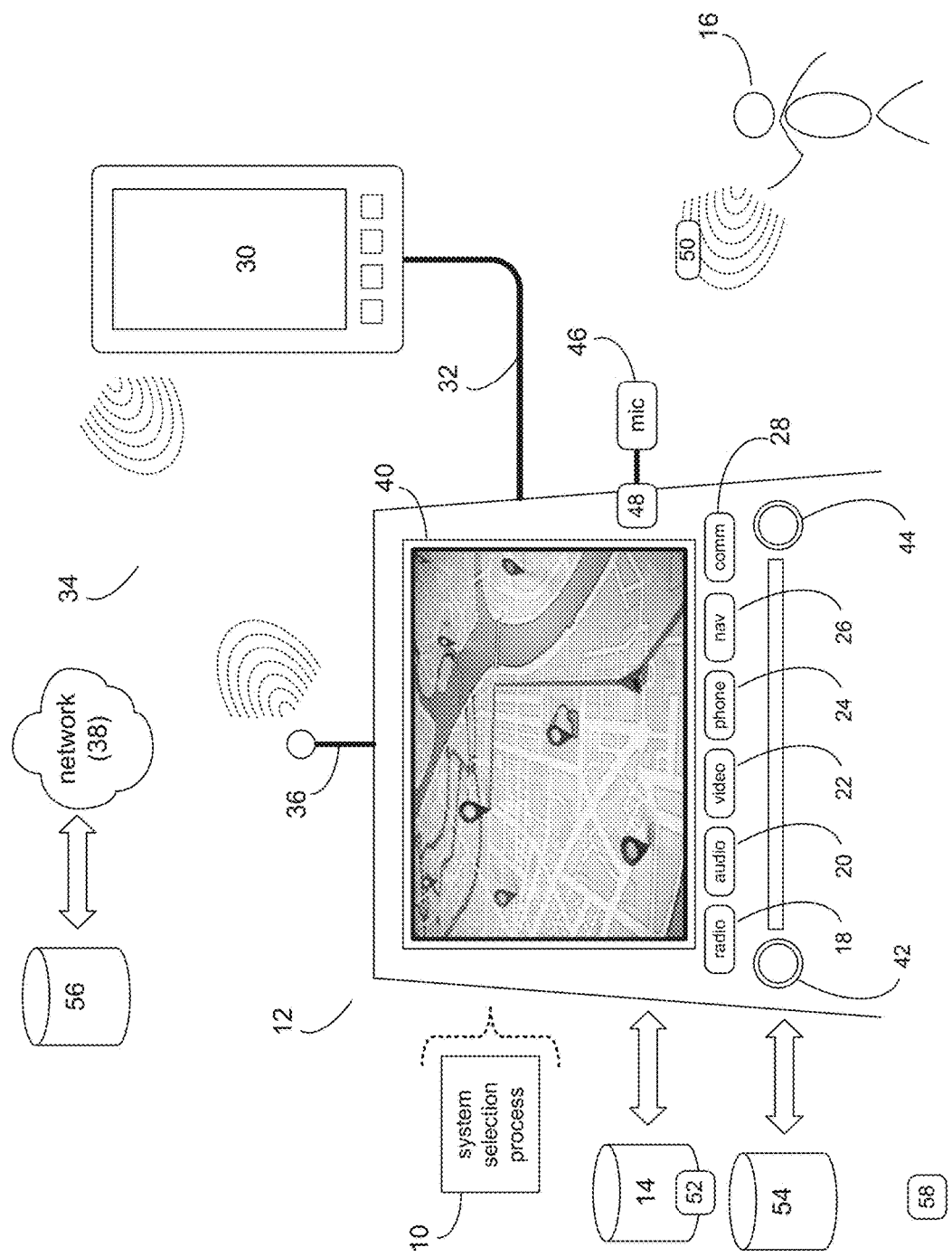
FIG. 1 is a diagrammatic view of a consumer electronic device that executes a system information process according to an embodiment of the present disclosure.

In FIG. 1, there is shown system information process 10. System information process 10 may reside on and may be executed by consumer electronic device 12. An example of consumer electronic device 12 may include but are not limited to a vehicle infotainment system, such as vehicle navigation systems, vehicle music systems, vehicle video systems, vehicle phone systems, and vehicle climate control systems.

The instruction sets and subroutines of system information process 10, which may be stored on storage device 14 coupled to consumer electronic device 12, may be executed by one or more processors (not shown) and one or more memory architectures (not shown) included within consumer electronic device 12. Examples of storage device 14 may include but are not limited to: a hard disk drive; a RAID device; a random access memory (RAM); a read-only memory (ROM); and all forms of flash memory storage devices. Consumer electronic device 12 may execute an operating system, examples of which may include but are not limited to Microsoft Windows™, Android™, iOS™, Linux™, or a custom operating system.

When configured as a vehicle infotainment system, consumer electronic device 12 may be configured to execute various different functionalities that may be of interest/useful to a user (e.g., user 16). Examples of such functionalities may include but are not limited to: radio functionality (e.g., that enables the playing of terrestrial radio stations and satellite radio stations); audio functionality (e.g., that enables the playing of audio, wherein this audio may be disc-based or locally stored on storage device 14); video functionality (e.g., that enables the playing of video, wherein this video may be disc-based or locally stored on storage device 14); phone functionality (e.g., that enables the placing and receiving of phone calls); navigation functionality (e.g., that enables the execution of navigation/guidance functionality); and communication functionality (e.g., that enables the sending and receiving of email/text messages/instant messages).

When configured as a vehicle infotainment system, consumer electronic device 12 may include a plurality of buttons (e.g., physical buttons or electronic buttons) that enable the selection of the above-described functionality. For example, the above-described radio functionality may be selectable via "radio" button 18; the above-described audio functionality may be selectable via "audio" button 20; the above-described video functionality may be selectable via "video" button 22; the above-described phone functionality may be selectable via "phone" button 24; the above-described navigation functionality may be selectable via "nav" button 26; and the above-described communications functionality may be selectable via "comm" button 28.

When configured as a vehicle infotainment system, consumer electronic device 12 may be configured to interface with one or more external systems (e.g., external system 30). Examples of external system 30 may include but are not limited to: a cellular telephone; a smart phone; a tablet computing device; a portable computing device; and a handheld entertainment device (e.g., such as a gaming device). When interfacing with consumer electronic device 12, external system 30 may be releasably coupled to consumer electronic device 12 via a hardwired connection (e.g., USB cable 32). Alternatively, external system 30 may be wirelessly coupled to consumer electronic device 12 via wireless communication channel 34 established between external system 30 and antenna 36 of consumer electronic device 12. An example of wireless communication channel 34 may include but is not limited to a Bluetooth communication channel. As is known in the art, Bluetooth is a telecommunications industry specification that allows e.g., mobile phones, computers, and personal digital assistants to be interconnected using a short-range wireless connection.

Consumer electronic device 12 and/or external system 30 may be configured to be wirelessly coupled to/access an external network (e.g., network 38). Examples of network 38 may include but are not limited to the internet, a cellular network, a WiFi network, and/or a cloud-based computing platform.

As discussed above, consumer electronic device 12 may be configured to execute various different functionalities that may be of interest/useful for a user (e.g., user 16). Some of these functionalities may be locally resident on (provided by) consumer electronic device 12. Additionally/alternatively, some of these functionalities may be remotely resident on (provided by) external system 30. Examples of such remotely-resident functionalities may include phone functionality (e.g., that enables the placing and receiving of phone calls via consumer electronic device 12 using external system 30) and communication functional (that enables user 16 to send/receive email, send/receive text messages and/or send/receive instant messages) via consumer electronic device 12 using external system 30. Consumer electronic device 12 may also include display screen 40 and one or more knobs/dials 42, 44 that effectuate the use of such functionalities.

Consumer electronic device 12 may include microphone assembly 46 and speech-to-text conversion system 48 (such as those available from Nuance Communications, Inc. of Burlington, Mass.). Accordingly, consumer electronic device 12 may be configured to accept verbal commands (e.g., verbal command 50) that are spoken and provided by (in this example) user 16. As will be discussed below in greater detail, these verbal commands (e.g., verbal command 50) may be configured to allow user 16 to access and control the above-described functionalities in a hands-free fashion.

Figure 2:
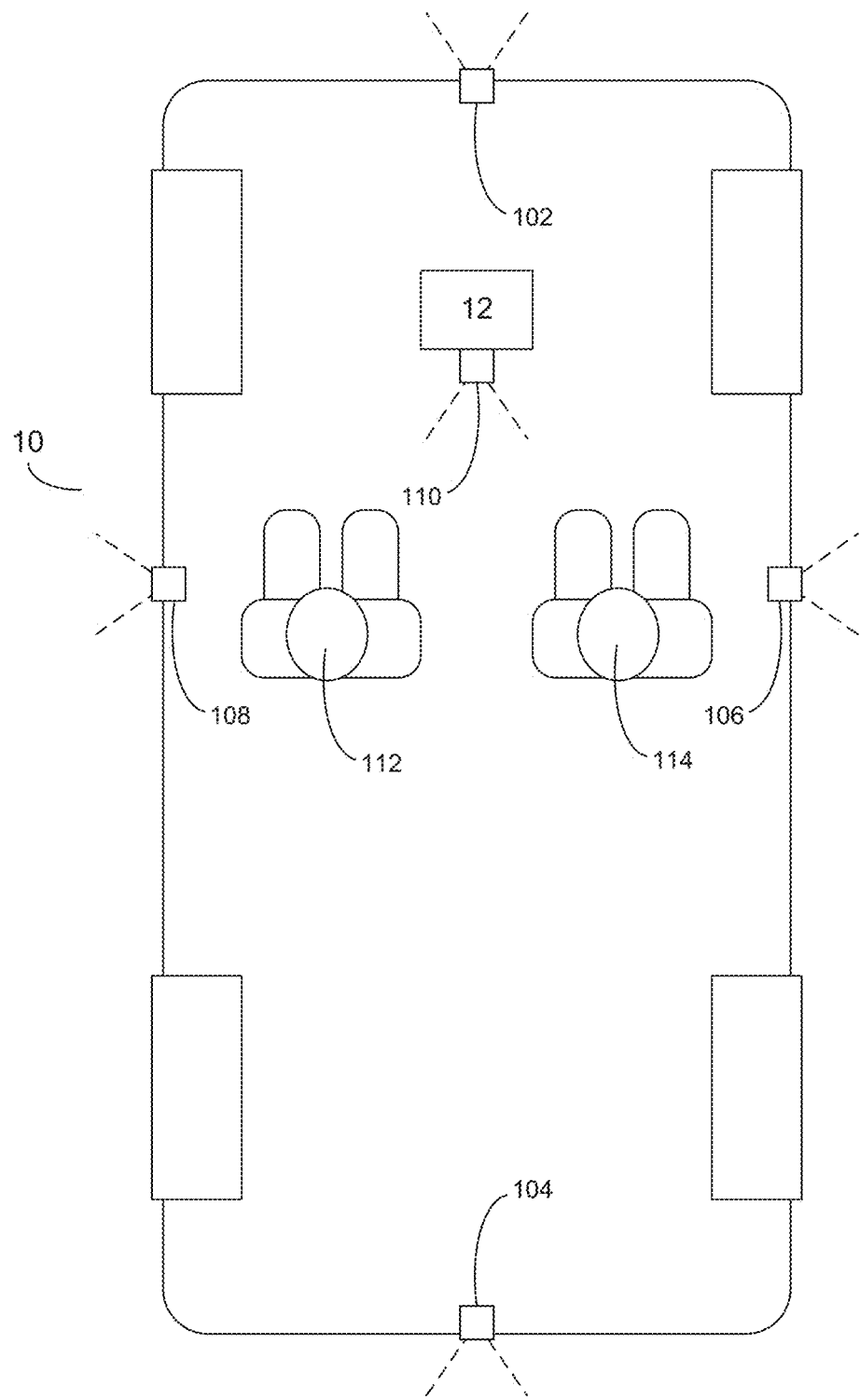
FIG. 2 is a diagrammatic view of a vehicle within which the consumer electronic device may be positioned.

Referring also to FIG. 2 and as discussed above, an example of consumer electronic device 12 may include a vehicle infotainment system that may be included within vehicle 100. Various sensors may be included within (or on) vehicle 100, wherein these sensors may be coupled to (or interfaced with) consumer electronic device 12. For example, these sensors may include one or more cameras that may be configured to obtain imagery proximate vehicle 100. For example:

Vehicle 100 may include forward-facing camera 102 that may be interfaced with consumer electronic device 12, wherein forward-facing camera 102 may be configured to capture imagery in front of vehicle 100. Examples of forward-facing camera 102 may include but are not limited to: a still image camera, a video camera, a visible light camera, an infrared camera, and a thermal-imaging camera.

Vehicle 100 may include rearward-facing camera 104 that may be interfaced with consumer electronic device 12, wherein rearward-facing camera 104 may be configured to capture imagery behind vehicle 100. Examples of forward-facing camera 102 may include but are not limited to: a still image camera, a video camera, a visible light camera, an infrared camera, and a thermal-imaging camera.

Vehicle 100 may include right-facing camera 106 that may be interfaced with consumer electronic device 12, wherein right-facing camera 106 may be configured to capture imagery to the right of vehicle 100. Examples of right-facing camera 106 may include but are not limited to: a still image camera, a video camera, a visible light camera, an infrared camera, and a thermal-imaging camera.

Vehicle 100 may include left-facing camera 108 that may be interfaced with consumer electronic device 12, wherein left-facing camera 108 may be configured to capture imagery to the left of vehicle 100. Examples of left-facing camera 108 may include but are not limited to: a still image camera, a video camera, a visible light camera, an infrared camera, and a thermal-imaging camera.

Additionally, vehicle 100 may include occupant sensor 110 that may be configured to sense various aspects of the occupants (e.g., occupants 112, 114) of vehicle 100. For example, occupant sensor 110 may be configured to sense the direction in which the eyes of the occupant (e.g., occupants 112, 114) of vehicle 100 are looking. Additionally/alternatively, occupant sensor 110 may be configured to sense the direction in which the head of the occupant (e.g., occupants 112, 114) of vehicle 100 is looking. Further, occupant sensor 110 may be configured to e.g., sense one or more gestures (e.g., pointing motions) made by the occupant (e.g., occupants 112, 114) of vehicle 100.

As stated above and as will be discussed below in greater detail, one or more of forward-facing camera 102, rearward-facing camera 104, right-facing camera 106, left-facing camera 108 and occupant sensor 110 may be coupled to (or interfaced with) consumer electronic device 12, wherein the data provided by forward-facing camera 102, rearward-facing camera 104, right-facing camera 106, left-facing camera 108 and/or occupant sensor 110 may be utilized by system information process 10.

As discussed above, consumer electronic device 12 may include microphone assembly 46 and speech-to-text conversion system 48 so that speech-based commands may be provided to consumer electronic device 12, wherein these verbal commands (e.g., verbal command 50) may allow user 16 to access and control the above-described functionalities (e.g., radio functionality; audio functionality; video functionality; phone functionality; navigation functionality; and communication functionality) in a hands-free fashion.

System Information Process

System information process 10 may be configured to process speech within vehicle 100. While the following discussion concerns system information process 10 continuously monitoring conversations within vehicle 100 for the occurrence of certain utterances by an occupant (e.g., occupants 112, 114) within vehicle 100, this is for illustrative purpose only and is not intended to be a limitation of this disclosure, as other configurations are possible and are considered to be within the scope of this disclosure. For example, system information process 10 may be configured to be manually activated by an occupant (e.g., occupants 112, 114) within vehicle 100 by e.g., pushing a button (such as a steering wheel mounted button; not shown). Alternatively, system information process 10 may be configured to be in a standby/sleep mode until e.g., a "wakeup" word/command is uttered (in a fashion similar to Amazon's Alexa™ or Apple's Siri™) by an occupant (e.g., occupants 112, 114) within vehicle 100.

Figure 2A:
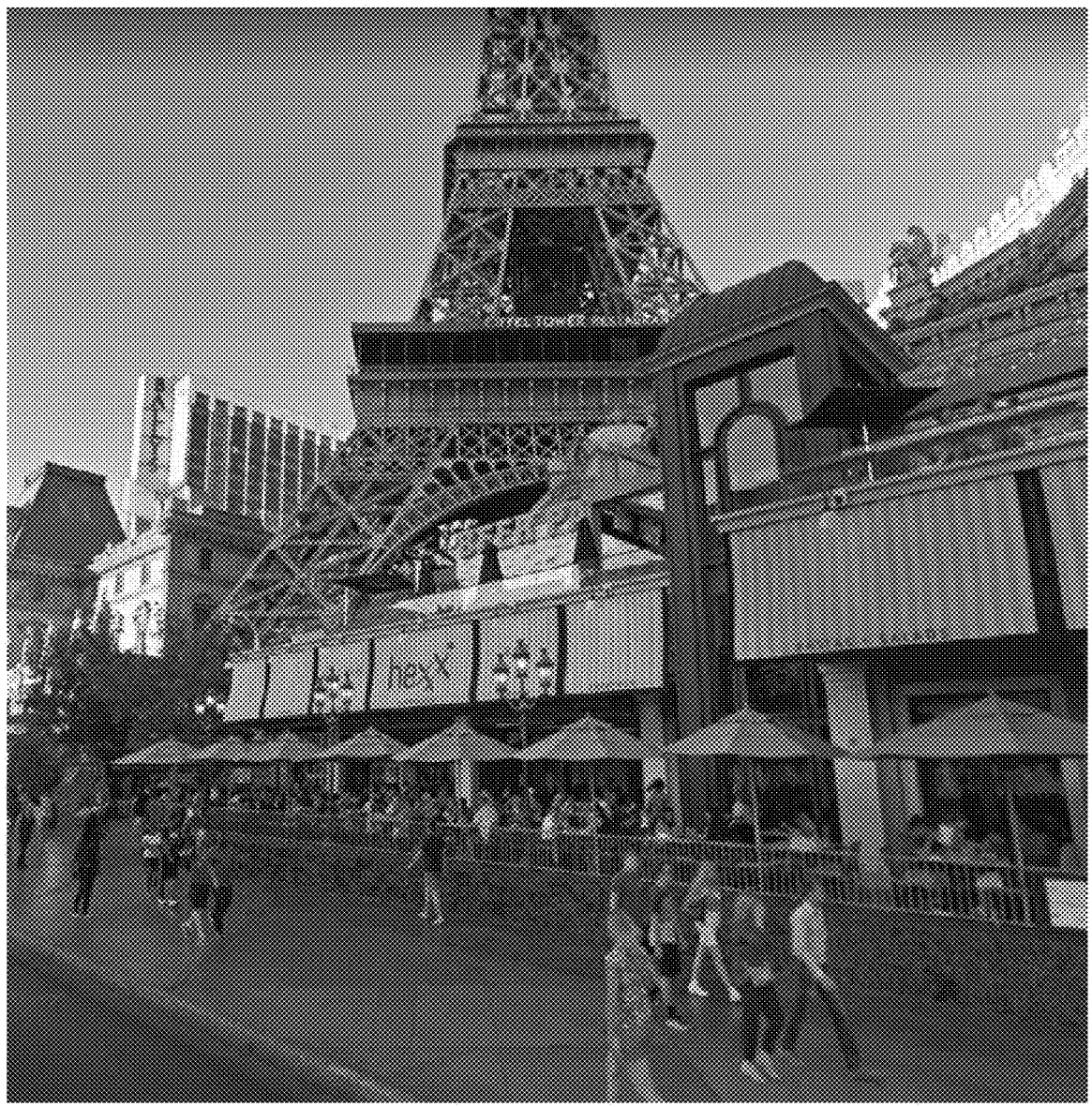
FIG. 2A is a diagrammatic view of an image as seen by an occupant of the vehicle of FIG. 2.

So for this example, assume that system information process 10 is configured to continuously monitor conversations within vehicle 100 for the occurrence of certain utterances by the occupant (e.g., occupants 112, 114) of vehicle 100, wherein these utterances may be indicative of the occupant (e.g., occupants 112, 114) of vehicle 100 wanting information concerning a geographically-proximate entity (e.g., something that they are driving past or see on the road). For example, assume that vehicle 100 is travelling North on the Las Vegas Strip in Las Vegas, Nev. and occupant 114 looks out of the right-side of vehicle 100 and sees a smaller scale version of the Eiffel Tower (as shown in FIG. 2A), wherein occupant 114 says "What is that Eiffel Tower?"

This "utterance" (e.g., verbal command 50) may be interpreted by system information process 10 to be indicative of occupant 114 wanting information concerning this geographically-proximate entity. Specifically, system information process 10 may include a plurality of defined words/phases (e.g., words/phases 52 defined within storage device 14) that, when detected by system information process 10, constitute an utterance that is indicative of an occupant wanting information about an entity. Examples of such utterances may include but are not limited to "What is that . . . ", "Tell me about . . . ", "Look at that . . . ", "Oh wow . . . ", and "Did you see that . . . ", wherein speech (e.g., verbal command 50) that includes one or more of these utterances may be interpreted by system information process 10 to be a request for information concerning a geographically-proximate entity.

Figure 3:
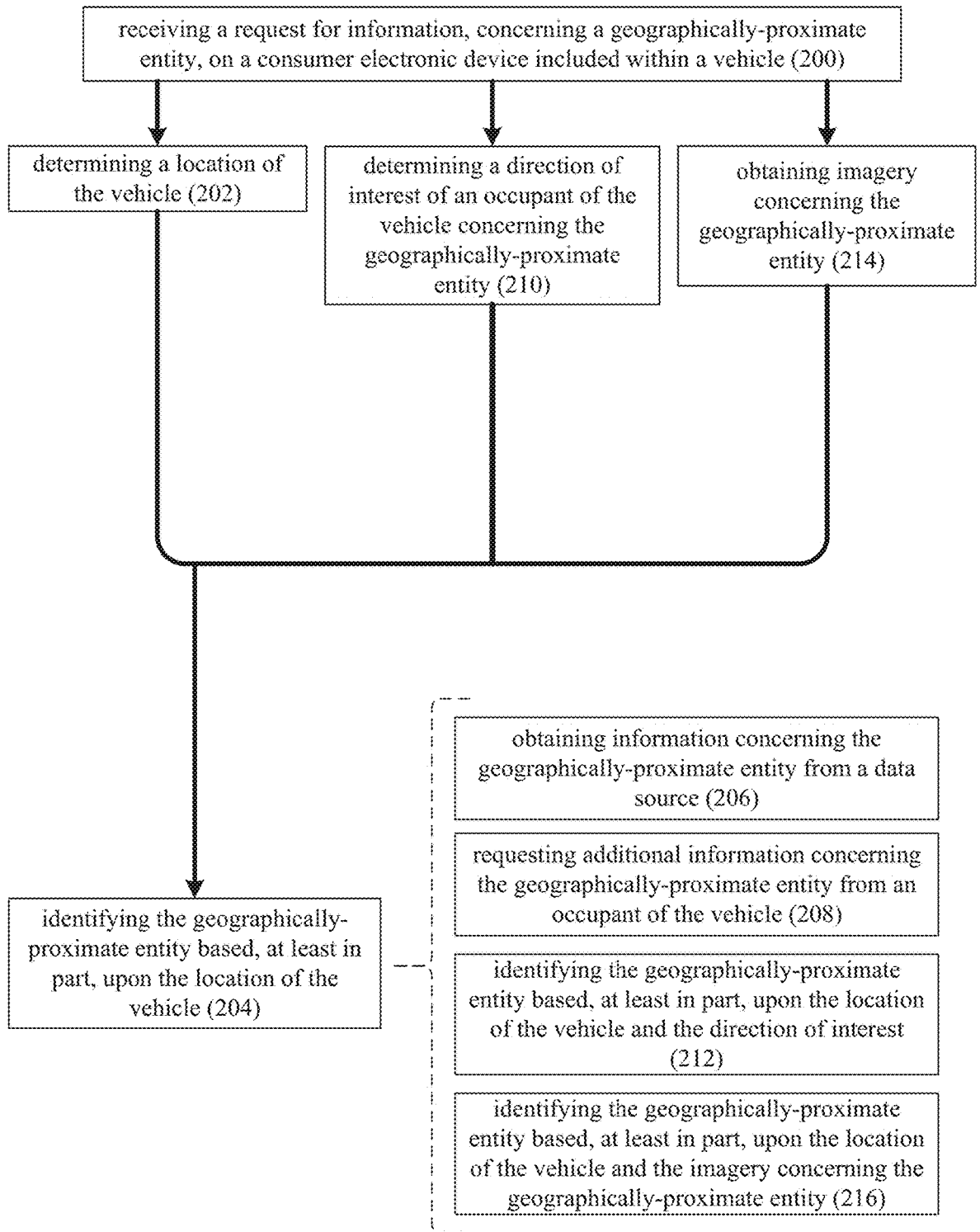
FIG. 3 is a flowchart of the system information process of FIG. 1 according to an embodiment of the present disclosure.

Accordingly and referring also to FIG. 3, system information process 10 may receive 200 this request for information (e.g., verbal command 50) concerning a geographically-proximate entity (e.g., What is that Eiffel Tower?) on consumer electronic device 12 included within vehicle 100. Upon receiving 200 this request for information (e.g., verbal command 50), system information process 10 may determine 202 a location of vehicle 100. As discussed above, consumer electronic device 12 may provide various functionalities, including navigation functionality. According, consumer electronic device 12 may include GPS (i.e., Global Positioning System) technology that may process a plurality of locating signals from a plurality of satellites so that the location of vehicle 100 may be determined 202 via triangulation. Alternatively, such GPS technology may be included within external system 30. Alternatively still, technology other than GPS technology may be utilized to determine 202 the location of vehicle 100. For example, cellular tower triangulation technology may be utilized to determine 202 the location of vehicle 100. Additionally and if the position of vehicle 100 is determined over a defined period of time, the direction and velocity of vehicle 100 may be determined by and/or available to system information process 10 (as a change in position with respect to time defines a velocity vector).

Accordingly and upon receiving 200 the request for information (e.g., verbal command 50), system information process 10 may first determine 202 that vehicle 100 is located on (and travelling North on) the Las Vegas Strip and may then identify 204 the geographically-proximate entity (e.g., the smaller scale version of the Eiffel Tower) based, at least in part, upon the location of vehicle 100.

When identifying 204 the geographically-proximate entity (e.g., the smaller scale version of the Eiffel Tower) based, at least in part, upon the location of vehicle 100, system information process 10 may obtain 206 information concerning the geographically-proximate entity (e.g., the smaller scale version of the Eiffel Tower) from a datasource. For example, system information process 10 may access one or more external datasources (e.g., datasource 54 included within consumer electronic device 12 and/or datasource 56 accessible via network 38) to obtain 206 such information.

Accordingly and when identifying 204 the geographically-proximate entity (e.g., the smaller scale version of the Eiffel Tower) based, at least in part, upon the location of vehicle 100, system information process 10 may access datasource 54 and/or datasource 56 to search for and obtain 206 information concerning entities at the location determined 202 for vehicle 100. Additionally and when identifying 204 the geographically-proximate entity (e.g., the smaller scale version of the Eiffel Tower), specific information included within the request may be considered (e.g., the words "Eiffel" and "Tower"). Accordingly and assuming that datasource 54 and/or datasource 56 have the appropriate information and the required level of detail, when system information process 10 executes a search (on e.g., datasource 54 and/or datasource 56) that defines the term "Eiffel", the term "Tower" and the location of vehicle 100, the geographically-proximate entity may be identified 204 as the Paris Las Vegas Hotel and Casino.

While the above example concerns an initial inquiry that may be consider somewhat vague, it is understood that this is for illustrative purposes only and other (more detailed) inquiries may be initially made. Accordingly, other examples of such initial inquires may include but are not limited to: "What is that tower on my right?", "What is that brown structure?", "What is that brown Eiffel Tower on my right?", and "What times does the restaurant open in that Eiffel Tower on my right?")

In the event that the request received 200 by system information process 10 does not contain enough information to unambiguously identify the geographically-proximate entity (e.g., the smaller scale version of the Eiffel Tower) as the Paris Las Vegas Hotel and Casino; when identifying 204 the geographically-proximate entity (e.g., the smaller scale version of the Eiffel Tower) based, at least in part, upon the location of vehicle 100, system information process 10 may request 208 additional information concerning the geographically-proximate entity (e.g., the smaller scale version of the Eiffel Tower) from an occupant (e.g., occupants 112, 114) of vehicle 100. For example, system information process 10 may use a voice dialog to help the user disambiguate the initial request by e.g., showing a list of possible results with reference images, by asking a refinement question, or by asking a confirmation question ("Did you mean the Eiffel tower at the Paris Las Vegas Hotel?" while rendering a reference image on display screen 40).

Accordingly, system information process 10 may request 208 additional information by asking the occupant (e.g., occupants 112, 114) of vehicle 100 "What color is it?" or "Which side of the car are you looking out of?" Once the occupant (e.g., occupants 112, 114) of vehicle 100 provides this information to system information process 10 in the form of a verbal response (e.g., verbal command 50), system information process 10 may execute another search (on e.g., datasource 54 and/or datasource 56) that defines the term "Eiffel", the term "Tower", the location of vehicle 100, and the supplemental information (e.g., "brown" or "right") provided by the occupant (e.g., occupants 112, 114) of vehicle 100 so that the geographically-proximate entity (e.g., the smaller scale version of the Eiffel Tower) may be identified 204 as the Paris Las Vegas Hotel and Casino.

In order to further enhance the automated nature and accuracy of system information process 10, system information process 10 may determine 210 (e.g., via occupant sensor 110) a direction of interest of the occupant (e.g., occupants 112, 114) of vehicle 100 concerning the geographically-proximate entity (e.g., the smaller scale version of the Eiffel Tower). As discussed above, vehicle 100 may include occupant sensor 110 that may be configured to sense various aspects of the occupants (e.g., occupants 112, 114) of vehicle 100, such as the direction in which the eyes of the occupant (e.g., occupants 112, 114) of vehicle 100 are looking; the direction in which the head of the occupant (e.g., occupants 112, 114) of vehicle 100 is looking; and/or one or more gestures (e.g., pointing motions) made by the occupant (e.g., occupants 112, 114) of vehicle 100.

For example and when identify 204 the geographically-proximate entity (e.g., the smaller scale version of the Eiffel Tower) based, at least in part, upon the location of vehicle 100, system information process 10 may identify 212 the geographically-proximate entity (e.g., the smaller scale version of the Eiffel Tower) based, at least in part, upon the location of vehicle 100 and the direction of interest (e.g., as defined by occupant sensor 110) concerning the geographically-proximate entity (e.g., the smaller scale version of the Eiffel Tower). Accordingly, system information process 10 may execute a search (on e.g., datasource 54 and/or datasource 56) that defines the term "Eiffel", the term "Tower", the location of vehicle 100 and the direction of interest information provided by occupant sensor 110 so that the geographically-proximate entity (e.g., the smaller scale version of the Eiffel Tower) may be identified 204 as the Paris Las Vegas Hotel and Casino.

In order to further enhance the automated nature and accuracy of system information process 10, system information process 10 may obtain 214 imagery (e.g., captured imagery 58) concerning the geographically-proximate entity (e.g., the smaller scale version of the Eiffel Tower) via e.g., forward-facing camera 102, rearward-facing camera 104, right-facing camera 106, left-facing camera 108 that may be configured to capture imagery (e.g., captured imagery 58) around vehicle 100. For example, forward-facing camera 102, rearward-facing camera 104, right-facing camera 106, and left-facing camera 108 may be configured to continuously (or intermittently) capture imagery (e.g., captured imagery 58) proximate vehicle 100 so that this captured imagery (e.g., captured imagery 58) may be utilized by system information process 10 to identify the geographically-proximate entity (e.g., the smaller scale version of the Eiffel Tower).

For example and when identifying 204 the geographically-proximate entity (e.g., the smaller scale version of the Eiffel Tower) based, at least in part, upon the location of vehicle 100, system information process 10 may identify 216 the geographically-proximate entity (e.g., the smaller scale version of the Eiffel Tower) based, at least in part, upon the location of vehicle 100 and the imagery (e.g., captured imagery 58) concerning the geographically-proximate entity (e.g., the smaller scale version of the Eiffel Tower). For example, datasource 54 and/or datasource 56 may include an image database defining a plurality of images and the entities included within those images (e.g., via metadata), wherein captured imagery 58 may be compared to the images included within this image database so that the geographically-proximate entity (e.g., the smaller scale version of the Eiffel Tower) may be identified 204 as the Paris Las Vegas Hotel and Casino.

When system information process 10 obtains 214 imagery (e.g., captured imagery 58) concerning the geographically-proximate entity (e.g., the smaller scale version of the Eiffel Tower) via e.g., forward-facing camera 102, rearward-facing camera 104, right-facing camera 106, left-facing camera 108 that may be configured to capture imagery (e.g., captured imagery 58) around vehicle 100, captured imagery 58 may be used to help the user disambiguate or confirm the search results. For example, a software process (e.g., within network 38) may scan the images (e.g., captured imagery 58) for signs using image processing and OCR techniques. Any text included in the images (e.g., captured imagery 58) may then be used by system information process 10 to narrow down the search options or increase the confidence level regarding some of the options. For example, if the user asked "When is this Pharmacy closing tonight?", the ability of system information process 10 to identify a sign saying "Walgreens Pharmacy" may allow system information process 10 to isolate one building as the perfect match to the user query in situations where there might be many other candidates (businesses or buildings) around that Pharmacy. Similar type of image processing may allow the system to match a building or a place to the user query (or help disambiguate) by extracting distinct visual features such as the color of the building/place, its relative height, its shape (e.g. pyramid, tower), etc.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method executed on an infotainment system that is installed in a vehicle, said infotainment system comprising a wireless interface for connecting to a mobile phone, said method comprising said infotainment system executing the steps of: determining that a received utterance is a request for information concerning a geographically-proximate entity; determining a location of the vehicle; determining a direction-of-interest of an occupant of the vehicle, the direction-of-interest being a direction towards the geographically-proximate entity, wherein determining the direction-of-interest comprises determining a direction in which the occupant's eyes are looking; and; and-in response to the utterance, identifying the geographically-proximate entity based at least in part on the vehicle's location and the direction-of-interest.

2. The computer-implemented method of claim 1, further comprising obtaining imagery concerning the geographically-proximate entity.

3. The computer-implemented method of claim 2, wherein identifying the geographically-proximate entity includes identifying the geographically-proximate entity based, at least in part, upon the location of the vehicle, the direction-of-interest and the imagery concerning the geographically-proximate entity.

4. The computer-implemented method of claim 1, wherein identifying the geographically-proximate entity includes requesting additional information concerning the geographically-proximate entity from an occupant of the vehicle.

5. The computer-implemented method of claim 1, wherein identifying the geographically-proximate entity includes obtaining information concerning the geographically-proximate entity from a data source.

6. A computer program product residing on a non-transitory computer readable medium having a plurality of instructions stored thereon, wherein the instructions, when executed by a processor of an infotainment system in a vehicle, cause the processor to perform operations comprising determining that a received utterance is a request for information, concerning a geographically-proximate entity; determining a location of the vehicle; determining a direction-of-interest of an occupant of the vehicle concerning the geographically-proximate entity, wherein the determining the direction-of-interest comprises determining a direction in which the occupant's eyes are looking; and in response to the utterance, identifying the geographically-proximate entity based at least in part on the vehicle's location and the direction-of-interest.

7. The computer program product of claim 6, further comprising obtaining imagery concerning the geographically-proximate entity.

8. The computer program product of claim 7, wherein identifying the geographically-proximate entity based includes identifying the geographically-proximate entity based, at least in part, upon the location of the vehicle, the direction-of-interest and the imagery concerning the geographically-proximate entity.

9. The computer program product of claim 6, wherein identifying the geographically-proximate entity includes requesting additional information concerning the geographically-proximate entity from an occupant of the vehicle.

10. The computer program product of claim 6, wherein identifying the geographically-proximate entity includes obtaining information concerning the geographically-proximate entity from a data source.

11. An infotainment system in a vehicle, said infotainment system comprising a processor and memory configured to perform operations comprising determining that a received utterance is a request for information concerning a geographically-proximate entity; determining a location of the vehicle; determining a direction-of-interest of an occupant of the vehicle concerning the geographically-proximate entity, wherein the determining the direction-of-interest comprises determining a direction in which the occupant's eyes are looking; and identifying the geographically-proximate entity based, at least in part on the vehicle's location and the direction-of-interest.

12. The infotainment system of claim 11, further comprising obtaining imagery concerning the geographically-proximate entity.

13. The infotainment system of claim 12, wherein identifying the geographically-proximate entity based, at least in part, upon the location of the vehicle and the direction-of-interest includes identifying the geographically-proximate entity based, at least in part, upon the location of the vehicle, the direction-of-interest and the imagery concerning the geographically-proximate entity.

14. The infotainment system of claim 11, wherein identifying the geographically-proximate entity based, at least in part, upon the location of the vehicle and the direction-of-interest includes requesting additional information concerning the geographically-proximate entity from an occupant of the vehicle.

15. The infotainment system of claim 11, wherein identifying the geographically-proximate entity based, at least in part, upon the location of the vehicle and the direction-of-interest includes obtaining information concerning the geographically-proximate entity from a data source.

16. The computer-implemented method of claim 1, wherein the infotainment system executes the further step of requesting additional information about the entity.

17. The computer-implemented method of claim 16, wherein the request comprises a request to identify the entity's color.

18. The computer-implemented method of claim 1, wherein determining the direction-of-interest further comprises asking the occupant which side of the car the entity is on.

19. The computer-implemented method of claim 1, wherein the infotainment system renders an image of an entity on a display screen thereof and asks the occupant whether the entity thus displayed is the entity about which information is sought.

20. The computer-implemented method of claim 1, wherein the entity is one of plural candidate entities and wherein the infotainment system asks the occupant a confirmation question to determine which of the candidate entities is the entity about which information is sought.

* * * * *